No. 879,733. PATENTED FEB. 18, 1908.
F. B. CALDWELL.
TWINE CUTTER.
APPLICATION FILED SEPT. 11, 1907.

Inventor
Fred B. Caldwell

Witnesses

By Victor J. Evans
Attorney

THE NORRIS PETERS CO., WASHINGTON, D. C.

UNITED STATES PATENT OFFICE.

FRED B. CALDWELL, OF KENESAW, NEBRASKA.

TWINE-CUTTER.

No. 879,733.

Specification of Letters Patent.

Patented Feb. 18, 1908.

Application filed September 11, 1907. Serial No. 392,411.

*To all whom it may concern:*

Be it known that I, FRED B. CALDWELL, a citizen of the United States, residing at Kenesaw, in the county of Adams and State of Nebraska, have invented new and useful Improvements in Twine-Cutters, of which the following is a specification.

This invention relates to twine cutters and one of the principal objects of the same is to provide a twine cutter comprising a blade secured to a finger ring, said blade being backwardly curved so that a pull backward upon the hand will sever a cord or twine.

Another object of the invention is to provide a twine cutter in which the blade extends tangentially from the ring and is curved backwardly so that a piece of cord or twine engaged between the ring and blade may be readily cut by a slight movement of the hand.

These and other objects may be attained by means of the construction illustrated in the accompanying drawing, in which:—

Figure 1:
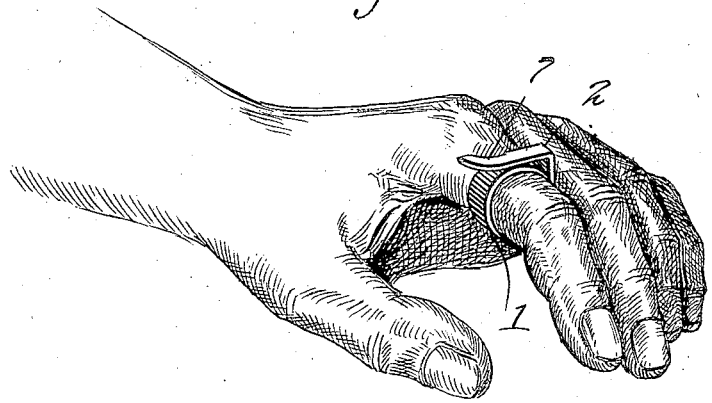
Figure 2:
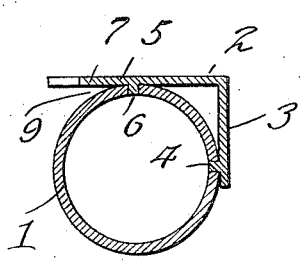
Figure 3:
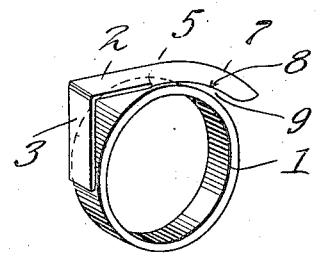
Figure 4:
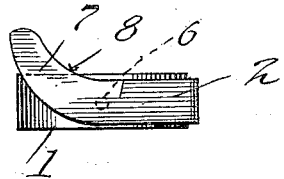

Figure 1 is a perspective view illustrating my twine cutter upon the index finger of a hand in position for use. Fig. 2 is a central vertical section through the twine cutter and the ring to which it is attached. Fig. 3 is a perspective view of the same. Fig. 4 is a plan view of the twine cutter.

Referring to the drawing for a more specific description of my invention, the numeral 1 designates a plain band ring adapted to fit the index finger of the hand and 2 is the twine cutter, said twine cutter having an angular shank 3 which is riveted at 4 to the ring. Extending at right angles to the shank 3 is a member 5 riveted at 6 to the ring, said rivets 4 and 6 being substantially at right angles, one to the other. A backwardly curved cutter blade 7 is formed on the portion 5, said blade curving backwardly and extending beyond the body of the ring, the cutting edge 8 of said cutter being disposed upon the concaved side of the curved blade.

In cutting a cord or piece of twine with my cutter the twine is passed between the ring and the cutter in the space 9, and doubled around the cutter. A slight movement of the hand will cut the cord.

From the foregoing it will be obvious that my invention is of simple construction, can be made to fit index fingers of various sizes, can be manufactured at slight cost and has been found very efficient for its purpose.

Having thus described the invention, what is claimed as new, is:—

The herein described twine cutter comprising a ring, a shank riveted to the ring, a member extending at right angles to said shank and riveted to the ring, and a curved cutting blade extending backwardly from said ring.

In testimony whereof I affix my signature in presence of two witnesses.

FRED B. CALDWELL.

Witnesses:
A. A. ARMITAGE,
ORVILLE J. CALDWELL.